United States Patent [19]
Bouzaglou

[11] Patent Number: 5,704,389
[45] Date of Patent: *Jan. 6, 1998

[54] WASTE LINE STOPPAGE DETECTOR AND AUTOMATIC WATER SHUTOFF SYSTEM

[75] Inventor: David Bouzaglou, North Hollywood, Calif.

[73] Assignee: Direct Plumbing, Heating & Rooter, Inc., N. Hollywood, Calif.

[ * ] Notice: The term of this patent shall not extend beyond the expiration date of Pat. No. 5,515,883.

[21] Appl. No.: 602,146

[22] Filed: Feb. 15, 1996

Related U.S. Application Data

[63] Continuation of Ser. No. 269,921, Jun. 30, 1994, Pat. No. 5,515,883.
[51] Int. Cl.⁶ ................................................ F16K 34/05
[52] U.S. Cl. ................... 137/357; 137/101.27; 137/412; 137/487.5
[58] Field of Search ................... 137/412, 101.27, 137/487.5, 357

[56] References Cited

U.S. PATENT DOCUMENTS

| | | | |
|---|---|---|---|
| 1,931,791 | 10/1933 | Dueringer | 137/487.5 |
| 2,885,879 | 5/1959 | Bloom | 137/412 |
| 3,729,020 | 4/1973 | Koci et al. | 137/522 |
| 4,180,088 | 12/1979 | Mallett | 137/87 |
| 4,297,686 | 10/1981 | Tom | 340/604 |
| 4,607,399 | 8/1986 | Yovanofski | 137/412 |
| 4,659,063 | 4/1987 | Veillette et al. | 251/68 |
| 4,889,154 | 12/1989 | Rosenberg | 137/474 |
| 4,928,727 | 5/1990 | Dufresne | 137/360 |
| 5,004,014 | 4/1991 | Bender | 137/624.12 |
| 5,209,254 | 5/1993 | Ancselovics | 137/357 |
| 5,240,022 | 8/1993 | Franklin | 137/1 |
| 5,267,587 | 12/1993 | Brown | 137/624.12 |

*Primary Examiner*—A. Michael Chambers
*Attorney, Agent, or Firm*—Lyon & Lyon LLP

[57] ABSTRACT

A waste line stoppage detector and automatic water shutoff system is utilized to prevent the overflow of raw sewage from a plumbing fixture. Electronic shutoff valves are electronically connected to a waste line stoppage detector. One application involves using an electronic waste line stoppage detector. Another application involves using a diaphragm and switch waste line stoppage. A further application involves using a float ball and switch waste line stoppage detector.

16 Claims, 3 Drawing Sheets

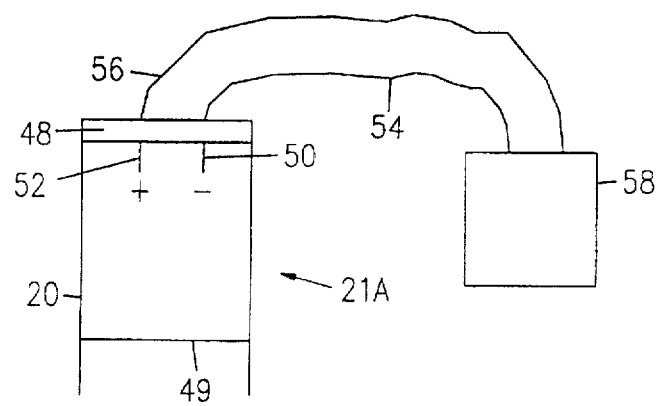
_fig.3_
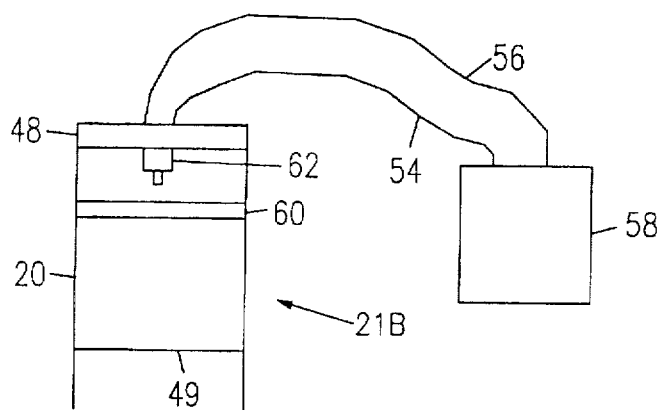
_fig.4_
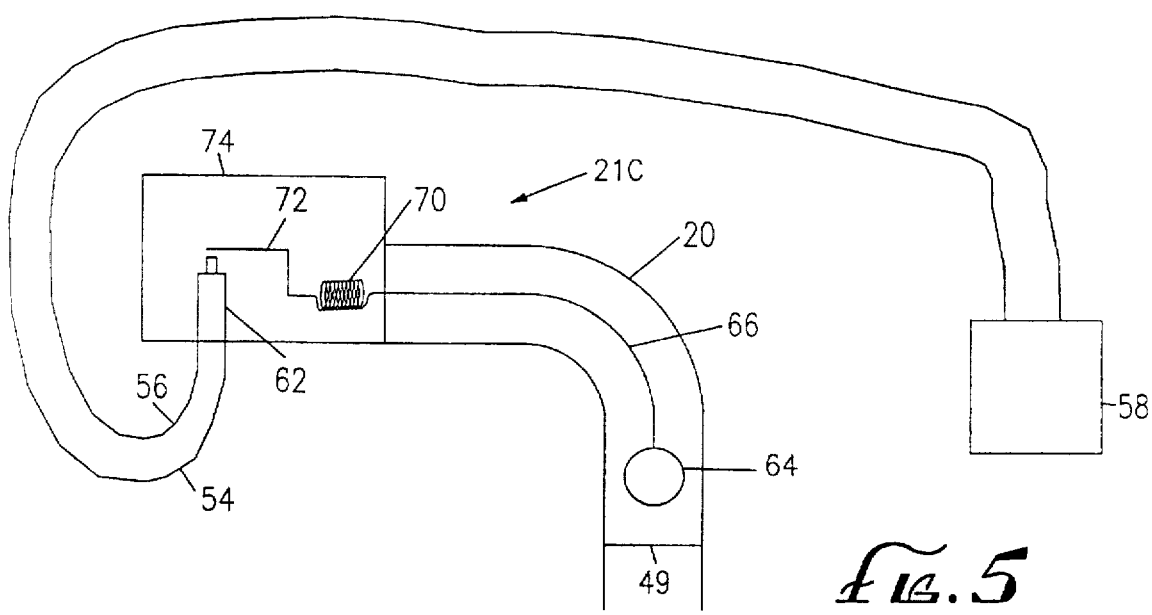
_fig.5_

WASTE LINE STOPPAGE DETECTOR AND AUTOMATIC WATER SHUTOFF SYSTEM

This is a continuation of application Ser. No. 08/269,921 filed Jun. 30, 1994 now U.S. Pat. No. 5,515,883, issued May 14,1996.

BACKGROUND OF THE INVENTION

The field of the present invention is plumbing.

Typically, in multilevel residential structures such as apartment buildings and condominium complexes, the plumbing fixtures, e.g. sinks, toilets, showers and bathtubs, are stacked such that a given fixture on the top level will share common waste and water supply lines with the same type of fixture on all the lower levels. Occassionally, a stoppage will occur in the waste line below the waste line connection between an upper and lower unit. Such a stoppage may occur due to too large an item being sent down a drain, a collection of various waste materials, or some other event which may clog a waste line. When such a stoppage occurs, the resident of the lower unit may not be aware of the stoppage until the fixture overflows from water and raw sewage backing up the waste line. The resident in the upper unit may not be aware of the stoppage unless he or she becomes aware of the overflow in the lower unit. In any event, since the stoppage has occurred in the waste line below the connection between the upper and lower units, as the resident of the upper unit continues to use the upper stacked fixture, the lower stacked fixture will continue to overflow with water and raw sewage until the stoppage is removed. And, if the resident of the lower unit is at work, asleep or on vacation when the stoppage occurs, substantial water damage to floors, carpeting, cabinets, and other items near the fixture may occur due to continued use of the upper fixture.

When such a stoppage occurs between in a unit between the lower and top unit, such as a third level unit, the health and safety risks are exacerbated by water and raw sewage leaking through the ceiling into the lower units and may damage the ceiling and other parts of the lower units. An overflow in any unit constitutes a serious health and safety hazard due to the overflow of raw sewage into a residence.

SUMMARY OF THE INVENTION

The present invention is directed to a method and apparatus for detecting a stoppage in the waste line and automatically shutting off a water line.

BRIEF DESCRIPTION OF THE DRAWINGS

FIG. 3 is a schematic drawing of a preferred embodiment of a waste line stoppage detector utilizing an electrode detection configuration.

FIG. 4 is a schematic drawing of an alternative preferred embodiment of a waste line stoppage detector utilizing a diaphragm and switch detection configuration.

FIG. 5 is a schematic drawing of an alternative preferred embodiment of a waste line stoppage detector utilizing a float ball and switch detection configuration.

DESCRIPTION OF THE PREFERRED EMBODIMENTS

Figure 1:
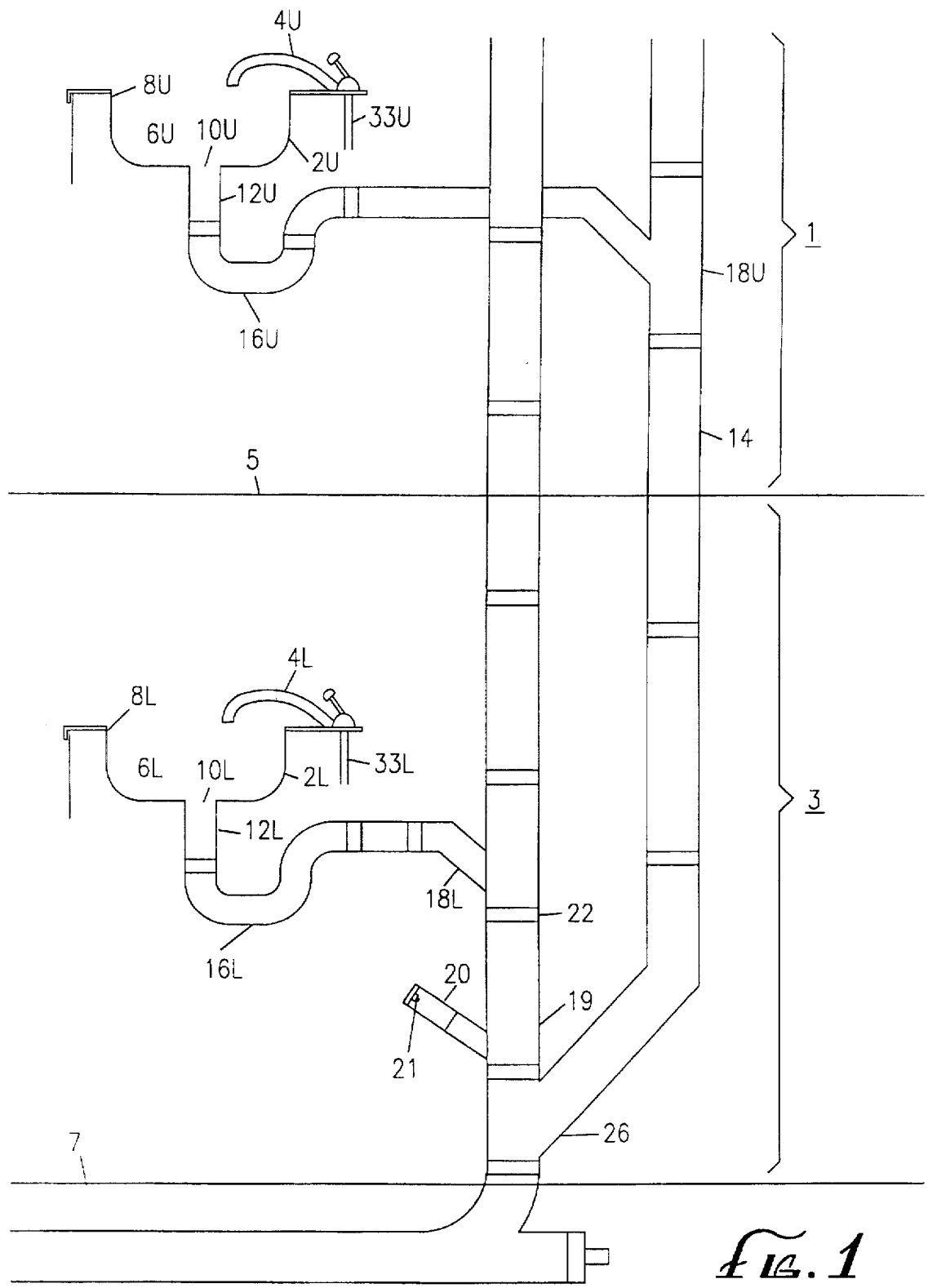
FIG. 1 is a schematic drawing of a typical waste and vent line configuration for a two story structure utilizing the waste line stoppage detector and automatic water shutoff system.

FIG. 1 illustrates a typical waste and vent line configuration for a two story structure utilizing the automatic shutoff system. In the upper unit 1, fixture 2U is depicted in FIG. 1 as a sink; however, fixture 2U could be a number of other water dispensing and receiving units, which can be constructed in a variety of shapes and sizes, including bathtubs, showers, jacuzzis, toilets, bidets, urinals, washing machines, and dishwashers. Fixture 2U includes a faucet 4U which is a water dispensing device and a water container 6U having a top lip 8U and drainage hole 10U. Drainage hole 10U is connected to drain 12U which is connected to vent/waste line 14 through P trap 16U and San T fitting 18U.

In the lower unit 3, fixture 2L includes a faucet 4L and a water container 6L having a top lip 8L and drainage hole 10L. Drainage hole 10L is connected to drain 12L which is connected to vent/waste line 22 through P trap 16L and San T fitting 18L. A waste line stoppage detector 21 is contained in pipe 20 which is connected to Y fitting 19 to vent/waste line 22 and is located in a relative position above upright Y fitting 26 and below top lip 8L. Vent/waste line 14 and vent/waste line 22 are connected by upright Y fitting 26. Preferably, waste line stoppage detector is located between the San T fitting 18L and the upright Y fitting 26. Such a location provides for early stoppage detection and prevents any raw sewage from overflowing into lower unit 3. In a three or greater story structure, additional detectors are preferably located between the San T fitting and the upright Y fitting that connects each successive level to the vent/waste line. For other fixtures utilizing different fittings, the waste line stoppage detector may be installed between the top lip of the lower unit fixture and above the connection of the upper unit and lower unit waste lines.

Figure 2:
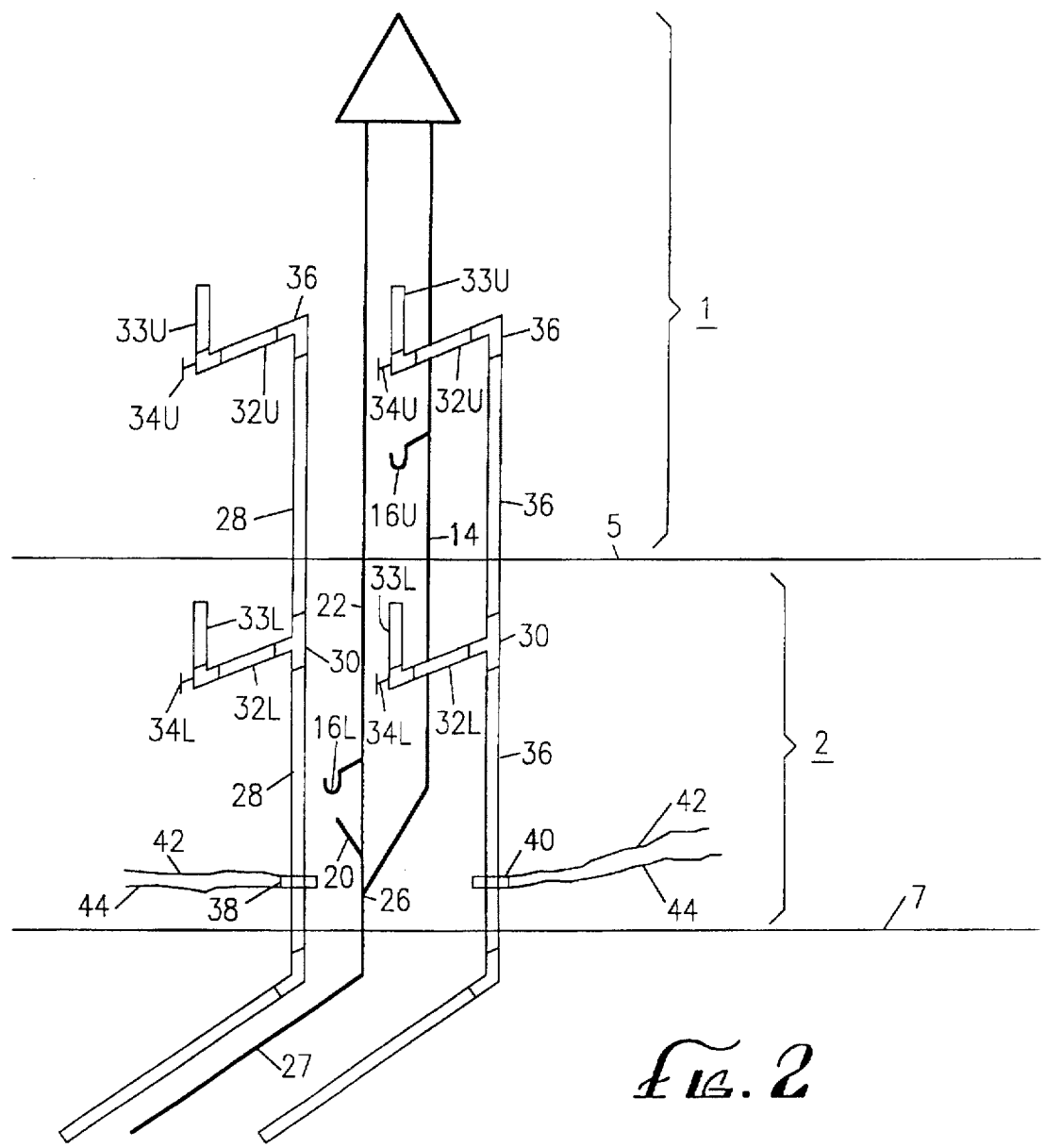
FIG. 2 is a schematic drawing of a typical water line configuration for a two story structure utilizing the waste line stoppage detector and automatic water shutoff system.

FIG. 2 depicts a typical water line configuration for a two story structure utilizing the automatic water shutoff system. The vent/waste lines 14 and 22 of FIG. 1 are in the same configuration as previously described except they are illustrated in less detail. Hot water line 28 is connected to the lower unit faucet 4L (See FIG. 1) through T fitting 30, straight pipe 32L, angle valve 34L which is a manual shutoff valve commonly associated with the water line for a fixture, and supply line 33L. Hot water line 28 is connected to the upper unit faucet 4U (See FIG. 1) through right angle fitting 36, straight pipe 32U, angle valve 34U, and supply line 33U. Cold water line 36 is connected to the lower unit faucet 4L (See FIG. 1) through T fitting 30, straight pipe 32L, angle valve 34L, and supply line 33L. Cold water line 36 is connected to the upper unit faucet 4U (See FIG. 1) through right angle fitting 36, straight pipe 32U, angle valve 34U, and supply line 33U. Electronic shutoff valve 38 is connected to hot water line 28 below T fitting 30 and electronic shutoff 40 valve is connected to cold water line 36 below T fitting 30. Electronic shutoff valves 38 and 40 are electrically connected to waste line stoppage detector 21 by positive wire 42 and negative wire 44.

The system generally functions as follows: A stoppage occurs in waste line 27 below upright Y fitting 26. Water will begin to back up waste line 27 from either the upper unit 1 or the lower unit 3 or from both units as water from faucet 4U (or 4L) enters water container 6U (or 6L), passes through drainage hole 10U (or 10L), drain 12U (or 12L), P trap 16U (or 16L), San T fitting 18 (or 18L) and enters either (or both) vent/waste lines 14 or 22 and passes through upright Y fitting 26 to waste line 27. Without the waste line stoppage detection and automatic water shutoff system in place water from upper unit 1 would continue to flow down vent/waste line 14 and backup through upright Y fitting 26, vent/waste line 22, San T fitting 18L, P-trap 16L, drain pipe 12L, drain hole 10L into container 6L of fixture 2L and eventually spill onto lower unit floor 7. However, with the waste line stoppage detection and automatic water shutoff system in place, as the water continues to back up vent/waste line 27, it will begin to back up into pipe 20 containing the waste line stoppage detector 21 therein to detect in the water. As described for each embodiment below, the waste line stoppage detector will activate electronic shutoff valves 38 and 40 to shut off hot and cold water lines 28 and 36 and thereby prevent an overflow of raw sewage into the lower unit.

FIG. 3 shows a preferred embodiment of the waste line stoppage detector 21 utilizing an electrode detection configuration 21A. A waste line stoppage detector 21A is contained in pipe 20 which preferably constructed of ABS or PVC plastic pipe. However, other plumbing pipe material such as copper, brass, galvanized pipe or other suitable material may also be used. Pipe 20 also contains screen 49 which prevents sewage from interfering with detection system. Attached to the top of waste line stoppage detector 21A is electrode detection cap 48 which is connected to pipe 20 such that water cannot escape waste line stoppage detector 21A. Cap 48 contains two electrodes, zinc cathode 50 and copper anode 52, which are suspended within pipe 20. The cathodes and anodes of the preferred embodiment may also be constructed of suitable alternate material. Positive wire 56 is connected to anode 52 and also to 24 volt transformer 58. Negative wire 54 is connected to cathode 50 which is also connected to 24 volt transformer 58. A 24 volt transformer 58 is electrically connected to electronic shutoff valves 38 and 40 (See FIG. 2) by positive and negative wires 42 and 44 (See FIG. 2).

The waste line stoppage electrode detector 21A functions generally as follows. Water begins to enter pipe 20 due to water backing up from a blockage in waste line 27 (See FIG. 1 and 2) as previously described. The water will continue to back up into pipe 20 until the water level reaches both zinc cathode 50 and copper anode 52 at which point a circuit is completed and a microcharge is generated between zinc cathode 50 and copper anode 52. The microcharge signal travels from waste line stoppage detector 21 to 24 volt transformer 58 and activates electronic shutoff valves 38 and 40. A voltage booster may be included to increase the voltage of the microcharge created by detector 21A. Alternatively, zinc cathode 50 and copper anode 52 may be contact elements that complete a circuit upon submersion in water between waste line stoppage detector 21A and 24 volt transformer 58 thereby activating electronic shutoff valves 38 and 40. In a specially preferred embodiment, the electronic shutoff valves contain a backup battery power source and include a locking circuit which requires a manual reset such that a general power failure will not deactivate the electronic shutoff valves.

FIG. 4 depicts an alternate preferred embodiment of waste line stoppage detector 21 utilizing a diaphragm and switch detection system 21B. Pipe 20 contains a flexible diaphragm 60 which may be constructed of any flexible material such as rubber or plastic which can withstand the pressure associated with the present invention. Pipe 20 also contains screen 49 which prevents sewage from interfering with detection system. Cap 48 contains a sensor switch 62 and negative and positive wires 54 and 56 which are electrically connected to switch 62 and 24 volt transformer 58. Sensor switch 62 is depicted as a push button switch; however, any switch that can be activated by the action of the diaphragm 60 could also be used.

The alternate preferred embodiment of waste line stoppage detector 21B depicted in FIG. 4 functions generally as follows. Water enters pipe 20 as described above; however, in this instance it will continue to rise until it reaches diaphragm 60. Once it reaches diaphragm 60 water pressure will build and diaphragm 60 will evert towards switch 62. Water pressure will continue to build and diaphragm 60 will continue to evert until switch 62 is activated, which completes the circuit between switch 62 and transformer 58 thereby activating the electronic shutoff valves 38 and 40.

As previously described, the preferred location for the waste line stoppage detector is between the San T fitting 18L and upright Y fitting 26. This ensures early detection of a stoppage so that raw sewage does not overflow into the lower unit. With regard to the diaphragm/switch detection system (described above) and also the float ball/switch detection system (described below), installing the waste line stoppage detector between the San T fitting and upright Y fitting also ensures that the backflow of water and sewage from a blockage will have sufficient pressure to activate the diaphragm/switch and float ball/switch type detectors.

FIG. 5 shows an alternative embodiment of waste line detector 21 utilizing a float ball and switch detection configuration 21C. Float 64 is attached to rod 66 both of which are contained in pipe 20 which in this embodiment is preferably a right angled pipe. Rod 66 is attached to spring 70. Spring 70 is attached to right angled arm 72 which is positioned next to sensor switch 62, all of which are contained in a housing 74. Positive and negative wires 54 and 56 are electrically connected to switch 62 and 24 volt transformer 58. Housings 64 and 74 are connected and sealed such that water cannot escape from housing 64 into housing 74. Pipe 20 also contains screen 49 which prevents sewage from interfering with detection system.

The alternative preferred embodiment of waste line stoppage detector 21C depicted in FIG. 5 functions generally as follows. Water will enter pipe 20 due to a stoppage in waste line 27 (See FIG. 1 and 2) as previously described. As the water enters pipe 20, float ball 64 will begin to rise and rod 66 will begin to exert pressure on spring 70. As the water pressure builds, pressure on spring 70 will rise as the float ball 64 rises until spring 70 causes arm 72 to trigger sensor switch 62. At that point, a circuit is completed and the electronic shutoff valves are activated as described above.

A waste line stoppage detector constructed as a closed system as described above will require consideration of the water and air pressure of the system to ensure that the water level will activate the detector prior to the water backflowing through the lower unit drainage system and overflowing out of fixture 2L. Use of a Y fitting for connecting the waste line stoppage detector to the drainage system allows most of the trapped air to escape through the vent portion of the vent/waste line. However, use of other fittings may require consideration of back pressure which is within the ordinary skill of the art to use the disclosure herein to modify the configurations for use with other fittings.

The waste line stoppage detectors described herein also have utility as an individual washing machine shutoff system. In such a system, one waste line stoppage detector is connected to the waste line of a washing machine and electrically connected to the internal shutoff system of the washing machine. When a stoppage is detected, the washing machine is shut off which prevents water from draining from or entering into the washing machine.

As previously described the complete waste line stoppage detector and automatic water shutoff system has particular advantage and utility in multi-level structures with stacked fixtures. For each additional unit of a multi-level structure the system is the same except that another stoppage detector may be included between the top lip of the fixture and additional unit to the waste line system. Additional shutoff valves may or may not be used on each additional lower unit depending upon whether the owner of the structure desires to shutoff the water to all the stacked fixtures or only those stacked fixtures affected by the waste line stoppage.

The present invention also has utility and advantage in multilevel structures or even single level structures that do not have stacked fixtures. In those applications, the waste line stoppage detector may be employed where more than one fixture is attached to a common waste line. In such an application, although the plumbing will be different than that described herein, the waste line stoppage detector may be installed just above the connection of the fixtures to the common waste line and below the top lip of the lowest fixture. And, the electronic shutoff valves should be installed in the common water lines below the lowest connection to one of the fixtures.

While the invention has application with utility and advantage in a variety of plumbing applications, the preferred embodiment has been described with respect to one particular application, namely, stacked sinks. However, the invention has similar application and utility with any other stacking fixture including but not limited to bathtubs, showers, jacuzzis, toilets, bidets, urinals, washing machines and dish washers. For fixtures utilizing fittings different than that described herein, the waste line stoppage detector may be installed between the top lip of the lower unit fixture and above the connection of the upper unit and lower unit waste lines. And, although the depiction contained herein illustrates the present invention for use with a sink which typically requires two water lines, hot and cold, the present invention has similar application to fixtures requiring only one water line such as toilets, bidets and urinals. It should be readily apparent that many more modifications of the apparatus and methods disclosed are possible without departing from the inventive concepts contained herein.

I claim:

1. A water supply and drainage system for a multilevel structure comprising:
    a. a lower level plumbing system comprising:
        (1) a first and second fixture;
        (2) a first and second water supply line for supplying water to said first and second fixture respectively;
        (3) a first and second waste line for draining waste water from said first and second fixture respectively;
        (4) an overflow prevention system for automatically shutting off said first water supply line independent of the water flow of said second water supply line in response to a detected backup in said first waste line, said overflow prevention system comprising:
            (a) a waste line stoppage detector attached to said first waste line for detecting a backup therein; and
            (b) an automatic shutoff valve in said first water supply line for shutting off water flow through said first water supply line in response to said stoppage detector detecting a backup in said first waste;
    b. an upper level plumbing system comprising:
        (1) a first and second fixture,
        (2) a first and second waste line for draining waste water from said first and second fixture respectively, and said first and second waste line connected to said lower level first and second waste line respectively; and
        (3) a first and second water supply line for supplying water to said first and second fixture respectively, and said first and second water supply line connected to said lower level first and second water supply line respectively.

2. The system of claim 1 wherein said stoppage detector is selected from the group comprising: two electrodes suspended in a housing, a float and sensor switch, and a diaphragm and sensor switch.

3. The system of claim 1 wherein said fixture is selected from at least one of the group comprising: a sink, a bathtub, a shower, a toilet, a urinal, a jacuzzi and a bidet.

4. The system of claim 1 wherein said first fixture is a kitchen sink.

5. A water supply and drainage system for a multilevel structure comprising:
    a. a lower level plumbing system comprising:
        (1) a first and second fixture;
        (2) a first and second water supply line for supplying water to said first and second fixture respectively;
        (3) a first and second drain for draining waste water from said first and second fixture respectively;
        (4) a first and second waste line attached to said first and second drain respectively;
        (5) a first and second upright Y fitting, said first upright Y fitting attached to said first waste line below said first drain, and said second upright Y fitting attached to said second waste line below said second drain;
        (6) an overflow prevention system for automatically shutting off said first water supply line independent of the flow of said second water supply line in response to a detected backup in said first waste line, said overflow prevention system comprising:
            (a) a waste line stoppage detector attached to said first waste line for detecting a backup therein, said first stoppage detector located in a relative position between said first drain and said first upright Y fitting; and
            (b) an automatic shutoff valve in said first water supply line for shutting off water flow through said first water supply line in response to said first stoppage detector detecting a backup in said first waste line; and
    b. an upper level plumbing system comprising:
        (1) a first and second fixture;
        (2) a first and second drain for draining waste water from said first and second fixture respectively;
        (3) a first and second waste line attached to said first and second drain respectively, and to said lower level first and second waste line respectively; and
        (4) a first and second water line for supplying water to said first and second fixtures respectively, and said first and second water line attached to said lower level first and second water line respectively.

6. The system of claim 5 wherein said stoppage detector is selected from the group comprising two electrodes suspended in a housing, a float and sensor switch, and a diaphragm and sensor switch.

7. The system of claim 5 wherein said fixture is selected from at least one of the group comprising a sink, a bathtub, a shower, a toilet, a urinal, a jacuzzi and a bidet.

8. The system of claim 5 wherein said first fixture is a kitchen sink.

9. A water supply and drainage system for a multilevel structure comprising:
    a. a plurality of lower level plumbing systems, each said system located on the same level and comprising:

(1) a first and second fixture;

(2) a first and second water supply line for supplying water to said first and second fixture respectively, said first and second water supply line respectively connected to a first and second water supply line of a plumbing system located in the level immediately above said lower level plumbing system;

(3) a first and second waste line for draining waste water from said first and second fixture respectively, said first and second waste line respectively connected to a first and second waste line of a plumbing system located in the level immediately above said lower level plumbing system, (4) an overflow prevention system for automatically shutting off said first water supply line in response to a detected backup in said first waste line independent of the flow of water of said second water supply line and independent of the flow of water through every other lower level plumbing system, said overflow prevention system comprising:

(a) a waste line stoppage detector attached to said first waste line for detecting a backup therein; and (b) an automatic shutoff valve in said first water supply line for shutting off water flow through said first water supply line in response to said first stoppage detector detecting a backup in said first waste line;

a plurality of upper level plumbing systems, each said system comprising:

(1) a first and second fixture;

(2) a first and second water supply line for supplying water to said first and second fixture respectively, said first and second water supply line respectively connected to said lower level first and second water supply line; and (3) a first and second waste line for draining waste water from said first and second fixture respectively, said first and second waste line respectively connected to said lower level first and second waste line.

10. The system of claim 9 wherein said stoppage detector is selected from at least one of the group comprising: two electrodes suspended in a housing; a float and sensor switch, and a diaphragm and sensor switch.

11. The system of claim 9 wherein said fixture is selected from at least one of the group comprising: a sink, a bathtub, a shower, a toilet, a urinal, a jacuzzi and a bidet.

12. The system of claim 9 wherein said first fixture is a kitchen sink.

13. A water supply and drainage system for a multilevel structure comprising:

a. a plurality of lower level plumbing systems, each said system located on the same level and comprising:

(1) a fixture;

(2) a water supply line for supplying water to said fixture;

(3) a waste line for draining waste water from said fixture;

(4) an overflow prevention system for automatically shutting off said water supply line of each said lower level plumbing system in response to a detected backup and independent of and every other lower level plumbing system; said overflow prevention system comprising:

(a) a waste line stoppage detector attached to said waste line for detecting a backup therein; and (b) an automatic shutoff valve in said water supply line for shutting off water flow through said water supply line in response to said stoppage detector detecting a backup in said waste line;

b. a plurality of upper level plumbing system, each said system located on the same level and comprising:

(1) a fixture;

(2) a water supply line for supplying water to said fixture, and said water supply line connected to said lower level water supply line; and (3) a waste line for draining waste water from said fixture, and said waste line connected to said lower level waste line.

14. The system of claim 13 wherein said stoppage detector is selected from at least one of the group comprising: two electrodes suspended in a housing; a float and sensor switch, and a diaphragm and sensor switch.

15. The system of claim 13 wherein said fixture is selected from at least one of the group comprising: a sink, a bathtub, a shower, a toilet, a urinal, a jacuzzi and a bidet.

16. The system of claim 13 wherein said fixture is a kitchen sink.

* * * * *